(12) United States Patent
Gilbert

(10) Patent No.: US 6,893,003 B2
(45) Date of Patent: May 17, 2005

(54) VALVES INCLUDING THERMALLY SPRAYED SEALING COMPONENTS

(75) Inventor: Jeffrey L. Gilbert, Lake Forest, CA (US)

(73) Assignee: Newfrey LLC, Newark, DE (US)

( * ) Notice: Subject to any disclaimer, the term of this patent is extended or adjusted under 35 U.S.C. 154(b) by 67 days.

(21) Appl. No.: 10/126,739

(22) Filed: Apr. 19, 2002

(65) Prior Publication Data

US 2003/0196700 A1 Oct. 23, 2003

(51) Int. Cl.$^7$ ................................................ E03B 1/00
(52) U.S. Cl. .............. 251/368; 137/625.41; 137/625.31
(58) Field of Search ..................... 251/368; 137/625.31, 137/625.41

(56) References Cited

U.S. PATENT DOCUMENTS

| | | | |
|---|---|---|---|
| 4,725,508 A | * 2/1988 | Rangaswamy et al. | 428/570 |
| 4,856,758 A | 8/1989 | Knapp | 251/368 |
| 4,935,313 A | * 6/1990 | Knapp et al. | 428/698 |
| 4,966,789 A | 10/1990 | Knapp et al. | 427/248.1 |
| 4,971,112 A | 11/1990 | Knapp | 137/625.17 |
| 4,983,355 A | 1/1991 | Alfons | 419/26 |
| 5,087,483 A | 2/1992 | Vargo | 427/235 |
| 5,100,565 A | 3/1992 | Fujiwara et al. | 251/368 |
| 5,107,884 A | * 4/1992 | Orlandi | 137/454.5 |
| 5,150,737 A | 9/1992 | Clerc | 137/625.3 |
| 5,355,906 A | 10/1994 | Marty et al. | 137/454.6 |
| 5,375,624 A | 12/1994 | Knapp | 137/625.17 |
| 5,377,713 A | 1/1995 | Friederich et al. | 251/368 |
| 5,518,027 A | 5/1996 | Saiki et al. | 137/550 |
| 5,633,094 A | * 5/1997 | Takeshima et al. | 251/368 |
| 5,755,261 A | 5/1998 | Fukuzawa et al. | 137/625.17 |
| 5,829,735 A | 11/1998 | Ikeda | 251/368 |
| 5,887,620 A | 3/1999 | Niwa et al. | 251/368 |
| 5,934,321 A | 8/1999 | Miya et al. | 251/368 |
| 5,975,103 A | 11/1999 | Meier et al. | 137/625.17 |
| 6,247,496 B1 | * 6/2001 | Ko | 137/625.31 |

* cited by examiner

Primary Examiner—A. Michael Chambers
(74) Attorney, Agent, or Firm—Harness, Dickey & Pierce, P.L.C.

(57) ABSTRACT

A valve assembly comprising a valve stem, an annular bonnet configured to receive the valve stem, a valve disk coupled to one end of the valve stem, a seal, and an insert. The seal is disposed adjacent the valve disk and has a top surface and a bottom surface. The top surface includes a first pair of sealing ridges extending upwardly therefrom and the bottom surface includes a second pair of sealing ridges extending downwardly therefrom. The insert includes a recess configured to receive the seal that performs a sealing function and a biasing function. The valve assembly can easily be configured to open in either a clockwise or counterclockwise direction without resort to adapters or other additional pieces by rotating the bonnet/valve stem subassembly 90° relative to the insert.

14 Claims, 5 Drawing Sheets

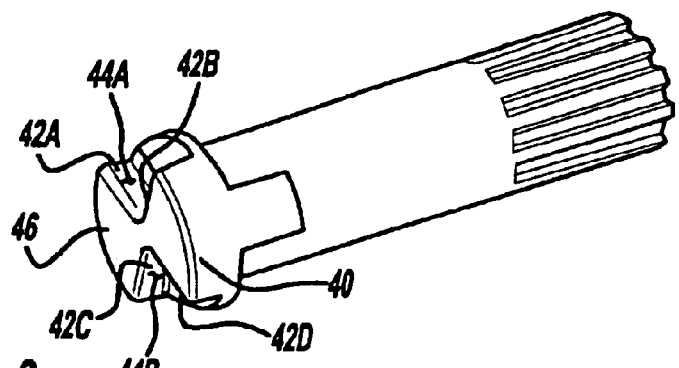
*Figure - 2*
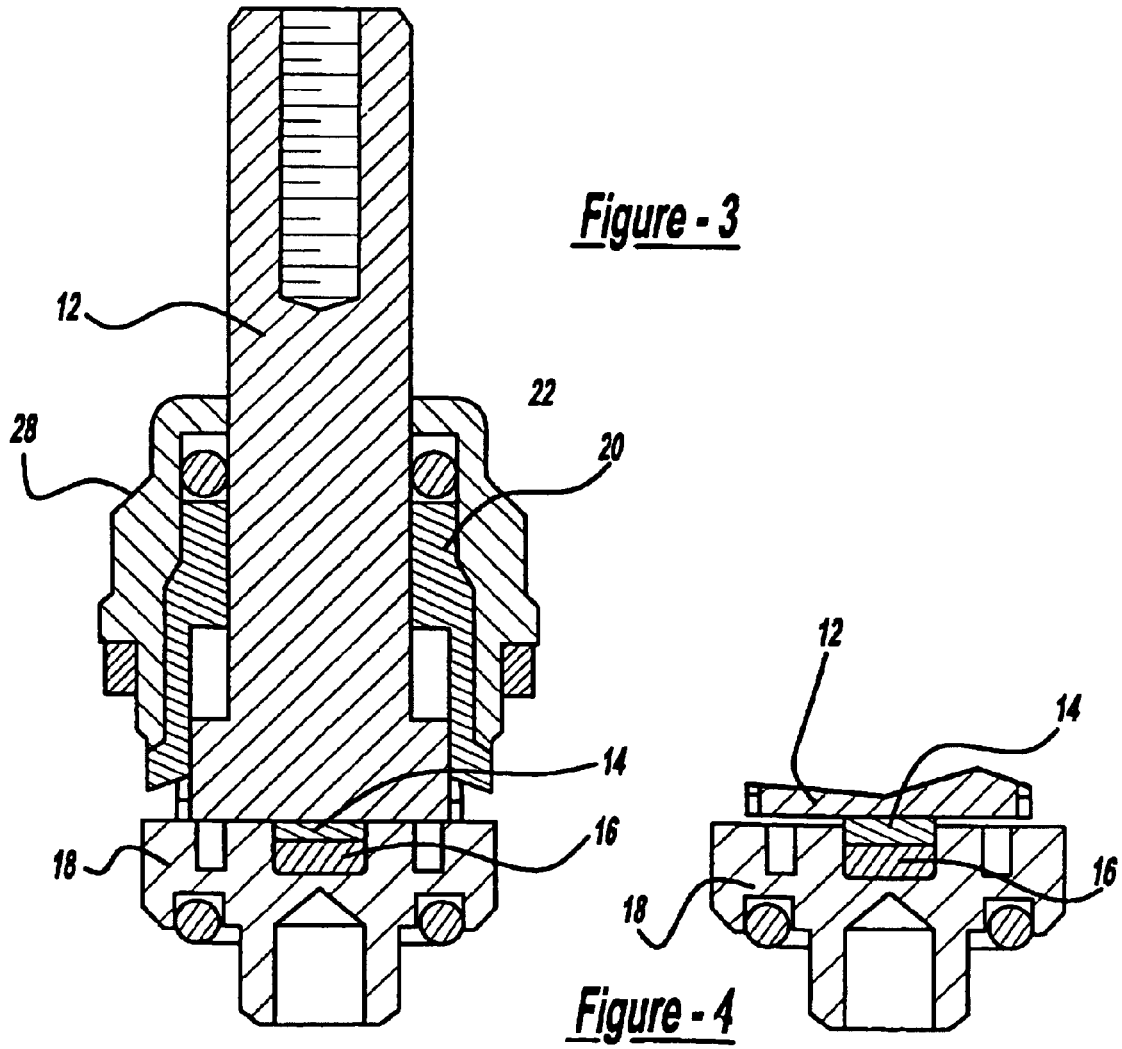
*Figure - 3*
*Figure - 4*

VALVES INCLUDING THERMALLY SPRAYED SEALING COMPONENTS

FIELD OF THE INVENTION

The present invention relates generally to valves and particularly to water valves for use with faucets. More particularly, the invention relates to faucet valves incorporating a valve stem having a coated sealing surface.

BACKGROUND AND SUMMARY OF THE INVENTION

Conventional valves are rising or non-rising. In conventional non-rising valves, a valve disk rotates relative to a fixed disk that is urged into contact with the disk by a spring. The use of a spring requires extra inventory and an additional step during the assembly process. A valve assembly that eliminates the spring and the rotating valve disk would provide a material and labor advantage to a manufacturer. In addition to a valve assembly which eliminates the requirement of a spring and rotating valve disk, a valve assembly which offers an alternative to physically or chemically vapor depositing low friction coatings on its sealing components would be desirable.

By way of comparison, U.S. Pat. No. 4,983,355 relates to seal elements formed by compression molding and sintering a powdered hard material and binder composition. The sintered sealing disk can be covered with a thin layer of a silicon carbide, metallic carbide, metallic nitride or carbon having a cubic crystallographic lattice structure applied by physical or chemical vapor deposition. The suggested advantage of this method appears to be a semi-finished product that can be of varying sometimes complicated configurations.

U.S. Pat. No. 4,966,789 relates to a pair of seal members which control the fluid flow of a faucet. The two seals are formed of a moderately hard material such as stellite, ceramic materials, metal materials or synthetic materials which can be precisely ground to a particular finish. At least one of the seal members is coated by either physical or chemical vapor deposition with a thin layer of very hard material such as silicon carbides, metal carbides, metal nitrides or cubic crystallographic lattice carbons. The resulting seal disks are suggested to have low friction coefficients thereby eliminating the need to provide a lubricant between the cooperating surfaces of the disks. In addition, adhesion between the seals is said to be eliminated despite the smooth surface finish of the disks.

Another faucet valve having a specialized sealing disk assembly is disclosed in U.S. Pat. No. 5,100,565. According to this patent, a valve comprising a stationary disk and a rotary disk wherein at least one surface of one of the disks includes a diamond like carbon film is provided. The film comprising diamond like carbon is said to be formed on at least one of the disks by means of a gas phase synthesizing process such as chemical vapor deposition or physical vapor deposition. Hereto the suggested advantage is a valve structure having minimal adhesion between contacting surfaces of the stationary and rotary disks.

While conventional coating processes such as chemical vapor or physical vapor deposition may be employed to coat the valve stem and/or the valve disks of the present invention, it is preferable that a thermal spray process be utilized. Both chemical and physical vapor deposition processes are carried out in a chamber by significantly raising the temperatures within the chamber and creating a vacuum. Because these processes are run at higher temperatures, this limits the substrate materials that can be used. Further, parts can only be produced in batches sized appropriately to the inside treatment chamber. Still another perceived problem is achieving stoichiometric reactions across the entire surface being coated. The chambers must be pumped down, brought to high temperatures for processing and then cooled down before parts can be unloaded from the treatment chamber. This procedure adds considerably to processing time. The coatings generally do not provide the ability to compensate for stamping variations. These processes require multiple chambers to yield the quantities of parts required for valves and are a considerable capital expense and maintenance issue for manufacturing.

According to one aspect of the present invention, a valve assembly employing a valve stem having a sealing surface and a valve disk having a complimentary sealing surface is provided. Preferably, at least one of the surfaces of the valve stem or the valve disk is provided with a low friction material selected from the group consisting of ceramics, cermets, glass and diamond-like carbon, among others. Among the useful ceramics are chromium oxide (chromia), aluminum oxide (alumina), titanium oxide (titania), yttrium oxide (yttria), yttria stabilized zirconia, aluminum titanate, magnesium aluminate (spinel), magnesium zirconate, as well as alloys or blends of these, by way of non-limiting example. Among the useful ceramic metals or "cermets" are tungsten carbide cobalt, tungsten carbide nickel, tungsten cobalt chromium, chromium carbide nickel, chromium carbide nickel chromium, as well as alloys or blends of these, by way of non-limiting example.

A preferred process for providing a coating of a low friction material on the sealing surface of the valve disk and/or the valve stem is by thermal spraying. That is not to say, however, that the valve disk cannot be a sintered ceramic component, for example, formed from a complimentary low friction material is that which is applied to the sealing surface of the valve stem.

By "thermally sprayed" or "thermal spraying", it is meant that the desired low friction material is applied by either high velocity oxygen fuel spraying, electric arc spraying or plasma spraying. Under a high velocity oxygen fuel technique, a large volume of gas is generated caused by the reaction of fuel gasses with oxygen and formation and thermal expansion of exhaust gases including carbon dioxide and water vapor. These gases exit the chamber through a narrow barrel (e.g., ¼", 5/16" diameter) several inches long (e.g., 4", 6", 9"). Because of the high pressure created in the combustion chamber, the gases exit the barrel at extreme velocities, thereby accelerating the molten particles. The particles can reach speeds approaching the velocity of the gases, e.g., particle velocities of over 2,500 feet per second have been measured. These high particle speeds and subsequent high kinetic energy, translate into dense coatings with some of the highest bond strengths possible.

The electric arc process involves producing an electric arc between two oppositely charged wires of the same or different metal composition. The wire material is melted between the tips of two charged wires that are fed through the gun. Molten metal produced by the arcing is then atomized by a gas stream and molten droplets are propelled to the part. Electrical power is provided by a power supply similar to that of a typical welding power supplies. Electrical power is delivered at 208/230/460/575 VAC. A common setup in U.S. factories requires 460 VAC at 30 amps delivered to the gun. Output from the gun is typically set for 20–35 volts and 105–300 amps. The wire is fed by electrical pneumatic motors pulling or pushing wire to gun. The wire spool feeders supply wire to the gun through conduits to the tips. Power from the power supply is provided to the gun at the copper contact tubes which are connected to metal tips to transfer electrical power from two contacting wires. Atomization air is typically provided by an air compressor although other gas sources are commonly employed. Typical atomization air is provided at approximately 60–70 cfm and 60–80 psi.

The two-wire arc process is limited to electrically conducting feedstock materials suitable for wire production. Recent developments in wire technology enable producing wires with metallic sheaths that are filled with non-metallic materials (e.g., ceramics, polymers). The two wire arc process can be performed with the wire being the same composition or two different compositions forming a composite coating in-situ. The spray process may be performed at ambient pressure in air, inert atmospheres at atmospheric and low pressure/vacuum conditions. Reactive metals (e.g., titanium) may be sprayed in a variety of gaseous environments to produce either very pure coatings (e.g., with inert gases-argon) or in gaseous environments forming compounds (e.g., TiN) having favorable material properties (i.e., mechanical, aesthetic).

The coatings produced from the electric arc process are a result of the equipment operating parameters, material and process conditions. The arc voltage, amperage, atomization gas (primary, secondary) and pressure may be varied producing a variety of coatings. Material considerations including diameter (e.g., $\frac{1}{16}$", $\frac{1}{8}$", 2 mm) and equipment component designs (e.g., nozzle configurations) control the size of the particle as well as the spray stream pattern. The gun-to-target stand-off distance, traverse rate as well as other process variables also significantly influence the resultant coatings.

Under a plasma spraying technique, an inert gas, usually argon with a mixture of hydrogen or nitrogen, flows through the space between the electrodes, where it is ionized to form a plasma. The feedstock powder material is carried in a stream of gas (e.g., argon, air) and injected into the flame either within the nozzle or as it emerges from the outer face of the anode. The flame accelerates the particles and they are melted by its high temperature, probably supplemented by heat given off as ions recombine and molecules re-associate on the surface of the particles. The molten droplets are propelled onto the target surface, where they solidify and accumulate to form a coating.

Particles are deposited at a rate estimated at roughly a million per second, accumulating into a coating at a rate that depends on the area to be covered and how fast the gun moves over the surface. Each particle solidifies on the order of a millionth of a second, from the orientation of the grains and the overall shape of the splats. As the impacting droplet flattens out on the surface, the substrate acts as a heat sink and a solidification front moves upward through the splat. Certain coatings form chemical bonds with their substrates and metallic coatings can establish a bond as the heat of plasma spraying (the workpiece can reach 200° C. unless it is cooled with jets of air) enables atoms of the coating and the substrate to interdiffuse. A preferred plasma spray apparatus is known under the tradename ELECTROCOTE MODEL 2500.

A preferred coating is formed wherein a series of overlapping sprays form a lamella or layered structure on the substrate. By applying the thermal spray to form a series of overlapping lamella, the overall porosity of layered structure can be maintained below about 5% which is sufficient to retain valve lubricant. The structure does not propagate cracking except locally or on edges, thereby providing a robust sealing surface compared to solid sintered ceramic that can propagate a crack and possibly chip or break into pieces. The thermal spray process can be performed outside of a chamber at atmospheric conditions thereby allowing more freedom of motion for application and unlimited part processing configurations. The coating produced by the thermal spray process can be readily applied in layers such that the final average thickness after lapping, if necessary, is between about 0.003 inches to about 0.008 inches, thereby allowing more flatness variation in a stamped substrate.

According to the present invention, a preferred valve assembly comprises a valve stem having a sealing surface, an annular bonnet configured to receive the valve stem, a valve disk having a sealing surface, a sealing disk and an insert, whereby at least one of the sealing surfaces includes a low friction sealing material. The sealing disk and valve disk are generally arranged in a stacked configuration and are disposed within a recess contained on the insert.

According to another aspect of the invention, a thermal spray process for applying sealing material to the sealing surface of the valve disk and/or the valve stem is disclosed.

According to another aspect of the invention, the valve disk and sealing disk are bow tie shaped and define a first pair of orifices for the passage of fluid therethrough. The sealing disk in particular provides both a sealing function and a biasing function.

According to another aspect of the invention, the valve assembly further includes means for changing the operation between a clockwise and a counterclockwise motion. The bonnet includes four legs that depend downwardly therefrom and the insert includes four projections. The legs are disposed between the projections in a first configuration wherein the valve opens with a clockwise movement. If the bonnet is disengaged from the projections, rotated 90° in either direction relative to the insert and re-engaged with the projections, the valve opens with a counterclockwise movement. Thus any valve manufactured with this feature can be used for knobs or levers without regard to handing. In addition, this feature eliminates the need for the adapters used in conventional valves.

Other features and advantages of the invention will become apparent from the following portion of this specification and from the accompanying drawings, which illustrate a presently preferred embodiment incorporating the principles of the invention.

BRIEF DESCRIPTION OF THE DRAWINGS

FIG. 2 is a perspective view of the valve stem for use in the valve assembly of FIG. 1.

FIG. 3 is a section view taken along the longitudinal axis of the valve assembly of FIG. 1.

FIG. 4 is a partial section view of the valve assembly illustrated in FIG. 3 prior to tightening down the valve stem.

DETAILED DESCRIPTION OF THE DRAWINGS

Figure 1:
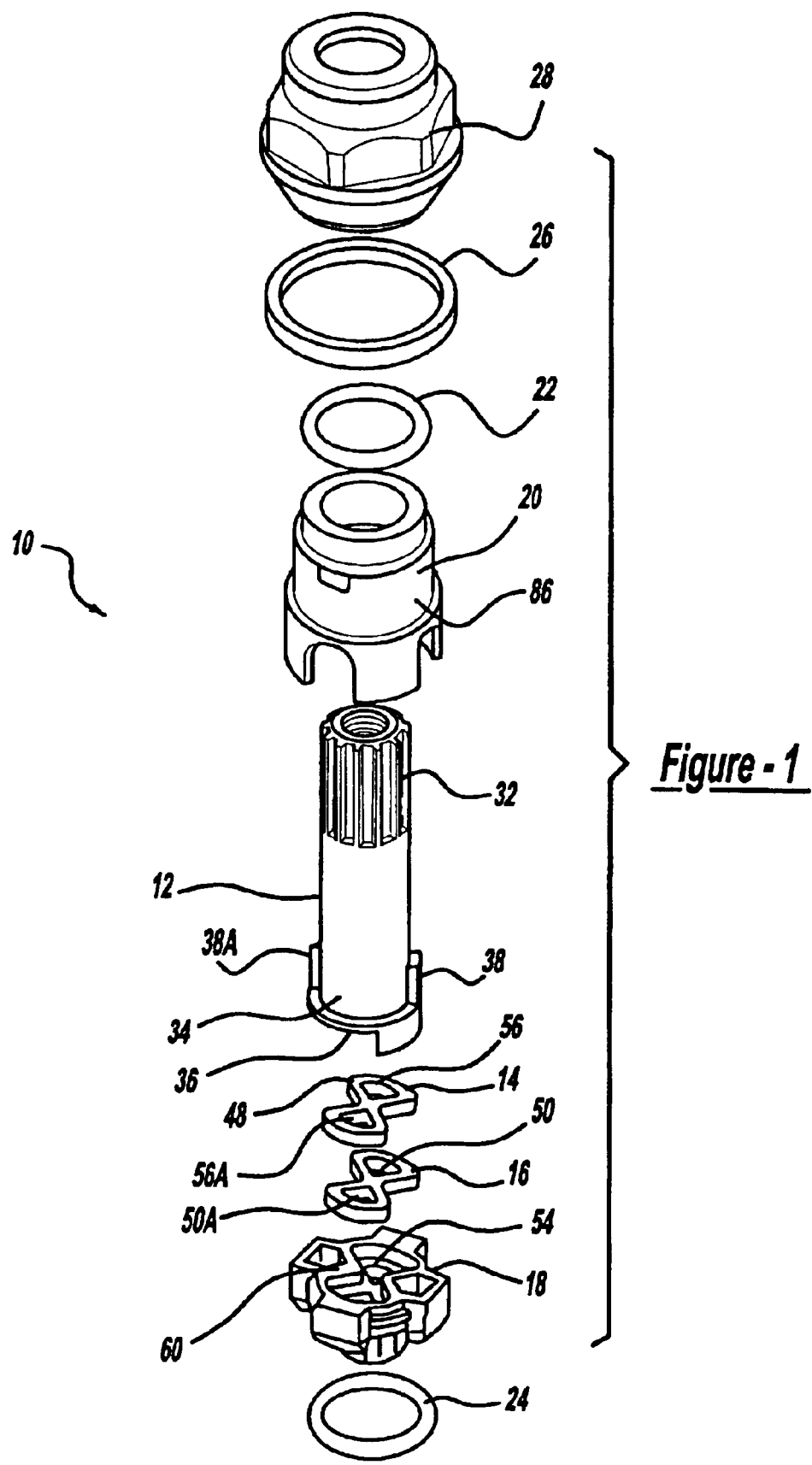
FIG. 1 is an exploded perspective view of one embodiment of a valve assembly including thermally sprayed sealing components according to the present invention.
Figure 5:
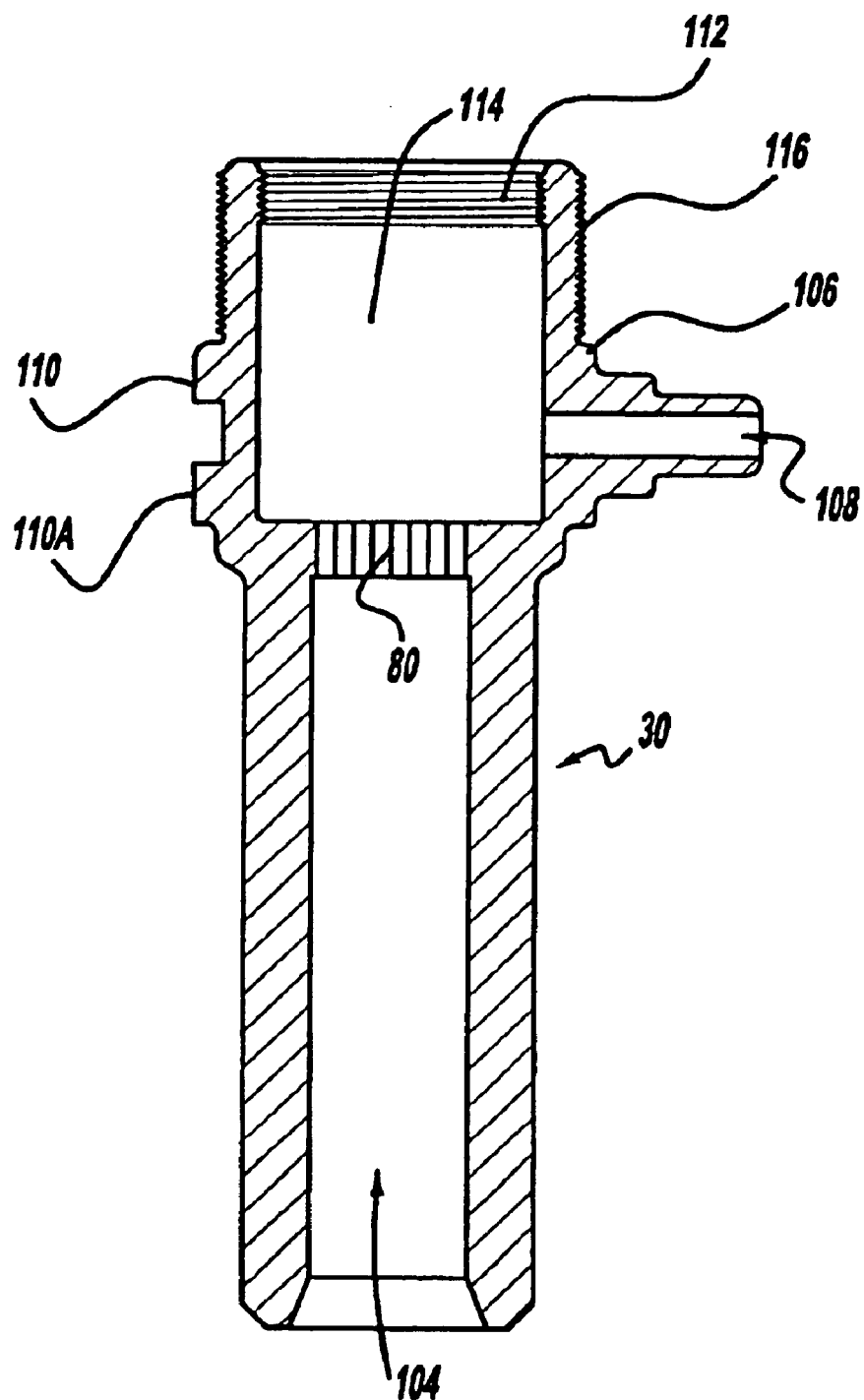
FIG. 5 is a section view taken along the longitudinal axis of an end body for receiving the valve stem.

A preferred valve assembly 10 according to the present invention is illustrated in FIGS. 1–2. The valve assembly 10 includes a valve stem 12, a valve disk 14, a sealing disk 16, an insert 18, a bonnet 20, a pair of O-ring seals 22, 24, a washer 26 and a bonnet hold down nut 28. The valve assembly 10 is configured to be inserted into the outlet of an end body 30, as illustrated in FIG. 5. It should be noted that while a preferred valve assembly is described, the concept of thermally sprayed valve disks as described herein, is not specifically limited to the valve assembly described.

The stem 12 includes a splined first end 32 and a second end 34. The second end 34 includes a lip 36 that extends radially beyond the circumference of the stem 12. A pair of stopping members 38, 38A extends axially from the lip 36 toward the first end 32 and are disposed diametrically on the stem 12. A bow tie shaped projection 40, as shown most clearly in FIG. 2, extends downwardly from the second end 34. The projection 40 includes a first pair of intersecting orthogonal walls 42A, 42B and a second pair of intersecting orthogonal walls 42C, 42D to define openings 44A and 44B, respectively. Occurring along the projection 40 is a sealing surface 46 which may include a low friction material as will be discussed in greater detail below.

The valve disk 14 is a bow tie shaped disk which includes a pair of substantially triangular shaped orifices 56, 56A. As illustrated in FIG. 4, the valve disk 14 seats over the bow tie shaped sealing disk 16 in a stacked relationship within the bow tie shaped recess 54 of the insert 18, the sealing disk 16 also having a pair of substantially triangular shaped openings 50, 50A. Prior to applying and tightening, the nut 28, a portion of the valve disk 14 including the sealing surface 48 projects above the planar surface 60 of the insert 18. Upon tightening the nut 28, the valve disk 14 is forced downwardly, thereby compressing the sealing disk 16 until the sealing surface 48 is level with the planar surface 60 of the insert. Thus, by forming the sealing disk from a material such as an elastomer, the sealing disk 16 advantageously provides a biasing function and a sealing function, thereby eliminating the need for a conventional biasing spring.

Preferably, at least one of the sealing surfaces 46 and 48, respectively, will be provided with a low friction material. As noted above, such low friction materials are generally selected from the group consisting of ceramics, cermets, glass and diamond-like carbon. Among the useful ceramics are chromium oxide (chromia), aluminum oxide (alumina), titanium dioxide (titania), yttrium oxide (yttria), yttria stabilized zirconia, aluminum titanate, magnesium aluminate (spinel), magnesium zirconate, as well as alloys or blends of these, by way of non-limiting example. Among the useful ceramic metals or "cermets" are tungsten carbide cobalt, tungsten carbide nickel, tungsten cobalt chromium, chromium carbide nickel, chromium carbide nickel chromium, as well as alloys or blends of these, by way of non-limiting example. Regardless of the material or materials utilized for forming the coating, the resultant coating will have a macro hardness of at least about $R_n$ 15 70.

Figure 6:
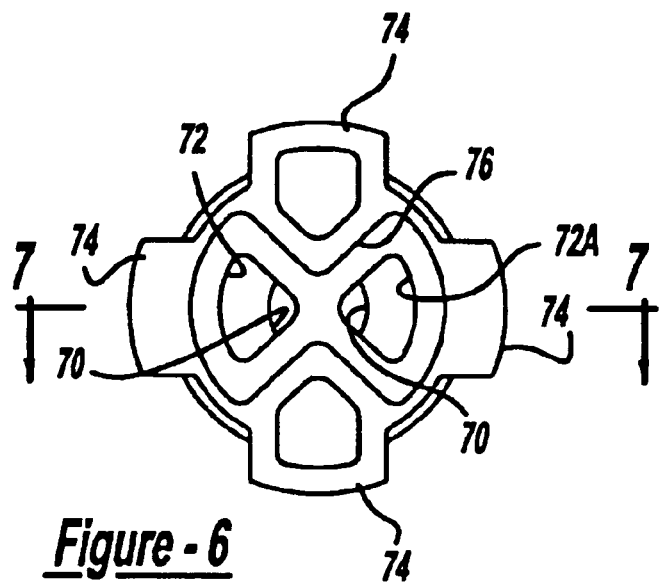
FIG. 6 is a plan view of the insert of the valve assembly illustrated in FIG. 1.
Figure 7:
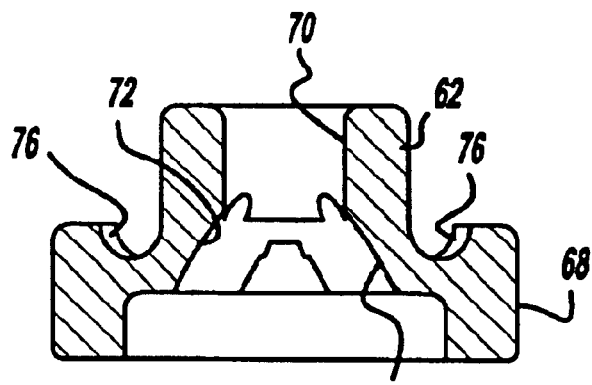
FIG. 7 is a section view taken along line 7—7 in FIG. 6.
Figure 8:
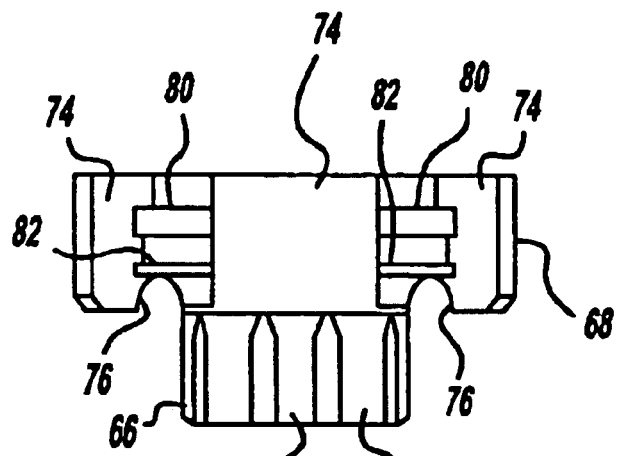
FIG. 8 is a side view of the insert of FIG. 6.

The insert 18, illustrated in FIGS. 6–8, includes a bottom portion 62 configured with splines 64 that engage splines 80 formed in the outlet of the end body 30 and an upper portion 68. The bottom portion 62 includes an inlet orifice 70 and the upper portion 68 includes a pair of outlet orifices 72, 72A that communicate with the inlet orifice 70. The outlet orifices 72, 72A are disposed in a bow tie shaped recess 54 that is configured to snuggly receive the valve disk 14 and sealing disk 16, with the seal orifices 50, 50A being aligned with the outlet orifices 72, 72A, respectively. The upper portion 68 includes four projections 74 that extend radially beyond the lower portion 62. The projections 74 cooperate with the upper portion to define an annular groove 76 for receiving the O-ring 24. A pair of flanges 80, 82 extend outwardly from the upper portion 68 between the projections 74 for engaging the bonnet 20.

Figure 9:
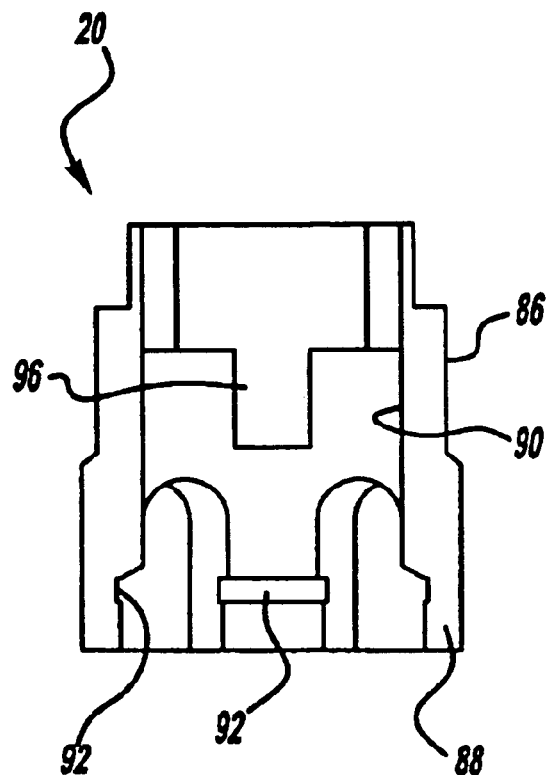
FIG. 9 is a section view through the bonnet of the valve assembly of FIG. 1.
Figure 10:
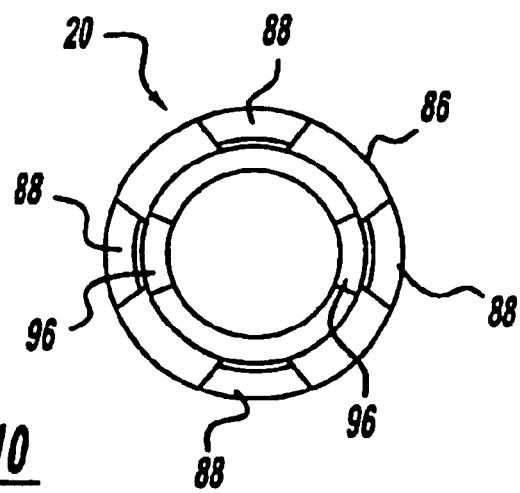
FIG. 10 is a bottom view of the bonnet of the valve assembly of FIG. 1.

The bonnet 20, illustrated in FIGS. 1 and 9–10, is an annular member that includes a body portion 86 and four legs 88, equally spaced around the perimeter and extending longitudinally from the bottom of the body portion 86. The inner surface 90 of each leg 88 includes a groove 92 for engaging the flange 80. The flange 82 abuts the inner surface 90 below the groove 92 to provide stability. A pair of stopping members 96 are diametrically disposed on the inner surface 90 of the body portion 86, extend inwardly from the inner surface 90. In operation, the stopping members 96 cooperate with the stopping members 38 on the stem 12 to restrict the stem to 90° of rotation.

An end body 30 for use with the valve assembly 10 is illustrated in FIG. 5. The end body 30 includes upper and lower portions. The tubular lower portion 102 includes external threads and a central passage 104 configured to receive the bottom portion 62 of the insert 18. The upper portion 106 includes a central passage 114 configured to receive the upper portion 68 of the insert 18 and an outlet 108. Upper and lower hexagonal flanges 110, 110A extend radially outwardly from the perimeter of the upper portion 106. The upper portion 106 also includes internal threads 112 and external threads 116. The internal threads 112 engage a bonnet hold down nut 28. The external threads 116 engage a valve assembly hold down nut (not shown) to retain the end body 30 in a faucet body or sink deck.

According to one aspect of the invention, the valve assembly 10 is an improvement over previously known designs in that it eliminates the need for a biasing spring and eliminates a second valve disk by utilizing the sealing surface 46 of stem 12 as one of the sealing components.

To effectuate sealing, particularly between the valve stem 12 and the valve disk 14, at least one of the sealing surfaces of the valve stem or the valve disk are provided with low friction materials such as ceramics, cermets and mixtures thereof. As noted above, a preferred method of applying low friction materials is by thermal spraying.

The valve stem 12 used in valve assembly 10 is typically formed from a metal such as stainless steel or brass. Prior to coating the sealing surface 48, the surface is preferably surface treated to enhance adhesion of the coating. A preferred treatment involves grit blasting the sealing surface at a pressure of at least about 30 psi. For brass or stainless steel valve stems, grit blasting through a quarter inch nozzle with 30 to 60 mesh aluminum oxide propelled at a rate of between about 30 psi to about 60 psi is preferable.

The valve disk 14 is generally formed by stamping strips of metal, preferably stainless steel, such as type 304 austenitic stainless steel, to shape. Prior to thermal spraying, the sealing surface 48 is generally surface treated to enhance adhesion of the coating. A preferred surface treatment involves grit blasting the sealing surface at a pressure of at least about 30 psi. For stainless steel substrates having a thickness of at least 0.025 inches and preferably at least 0.035 inches, grit blasting through a quarter inch nozzle with 30 to 60 mesh aluminum oxide propelled at a rate of between about 30 to 60 psi is useful.

As noted above, a preferred method of applying a low friction material to either the sealing surface of the valve stem or the sealing surface of the valve disk or both is by utilizing a thermal spray process. Under a thermal spray process, a series of overlapping sprays is useful in forming a coating lamella having an average thickness of at least about 0.005 inches. Preferably, the coating will have an average thickness of between about 0.005 inches to about 0.010 inches prior to lapping and/or grinding, depending on the valve type, e.g., ¼ turn or single control, for example. Among the preferred coating materials are aluminum oxide, chromium oxide and alumina-titania, among others. A highly preferred material is Norton #341, 15–45 micron, chromia 5% silica 3% titania. Once the application of the coating material is completed, the sealing surface of the valve stem and/or the valve disk is generally lapped or ground employing known techniques to achieve a smooth wear surface such that the coating has an average thickness of about 0.003 inches to about 0.008 inches.

Valve assemblies generally include at least one thermally sprayed sealing component has been described. It should be noted that the thermally sprayed valve disks of the present invention are not only useful as a component of the novel valve assembly set forth herein, but many also can be utilized as replacement valves in many valve assemblies which are currently in use or available commercially. Thus, it should be understood that various modifications can be made within the scope of the invention as claimed below.

What is claimed is:

1. A valve assembly comprising:
    a valve stem having a stem portion and a valve element integrally formed at an end of said stem portion, said valve element projecting downwardly from said valve stem portion and having a sealing surface formed thereon, said sealing surface coated with a low friction material having a macro hardness of at least about $R_n$ 15 70; and
    a valve disk subjacent said valve stem and in sealing contact with said sealing surface, said valve disk coated with a low friction material having a macro hardness of at least about $R_n$ 15 70 and having at least one orifice to selectively provide fluid communication through said valve disk upon rotation of said sealing surface relative to said at least one orifice.

2. The valve assembly of claim 1 wherein at least one of the sealing surfaces is coated by a thermal spray process.

3. The valve assembly of claim 2 wherein said thermal spray process is selected from high velocity oxygen fuel spraying, electric arc spraying and plasma spraying.

4. The valve assembly of claim 3 wherein said valve disk includes a substrate having a sealing surface which is coated by plasma spraying with a material having a macro hardness of at least about $R_n$15 70.

5. The valve assembly of claim 1 wherein said low friction material is selected from the group consisting of ceramics, cermets, glass and diamond-like carbon.

6. The valve assembly of claim 5 wherein at least one of the sealing surfaces is coated by a thermal spray process.

7. The valve assembly of claim 6 wherein said thermal spray is selected from high velocity oxygen fuel spraying, electric arc spraying and plasma spraying.

8. The valve assembly of claim 1 wherein said coating has an average thickness of between about 0.003 inches to about 0.008 inches.

9. The valve assembly of claim 1 wherein said coating has an overall porosity of less than about 5%.

10. The valve assembly of claim 1 wherein said valve disk is formed from stainless steel.

11. The valve assembly of claim 1 wherein said valve stem is formed from stainless steel or brass.

12. The valve assembly of claim 1 wherein said valve disk includes a pair of orifices for the passage of fluid therethrough.

13. The valve assembly of claim 12 wherein said valve disk is bow tie shaped.

14. The valve assembly of claim 1 wherein said downwardly extending projection of said valve stem is bow tie shaped.

* * * * *